(12) United States Patent
Jang et al.

(10) Patent No.: US 8,877,379 B2
(45) Date of Patent: Nov. 4, 2014

(54) POSITIVE ACTIVE MATERIAL FOR RECHARGEABLE LITHIUM BATTERY AND RECHARGEABLE LITHIUM BATTERY

(75) Inventors: Woon-Suk Jang, Yongin-si (KR); Chae-Woong Cho, Yongin-si (KR); Bum-Jin Chang, Yongin-si (KR); Ki-Jun Kim, Yongin-si (KR); Kwi-Seok Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 313 days.

(21) Appl. No.: 13/243,482

(22) Filed: Sep. 23, 2011

(65) Prior Publication Data

US 2012/0141874 A1 Jun. 7, 2012

(30) Foreign Application Priority Data

Dec. 3, 2010 (KR) .......................... 10-2010-0122753

(51) Int. Cl.
| | |
|---|---|
| *H01M 4/00* | (2006.01) |
| *H01M 4/13* | (2010.01) |
| *H01M 4/50* | (2010.01) |
| *H01M 4/42* | (2006.01) |
| *H01M 4/58* | (2010.01) |
| *H01M 4/88* | (2006.01) |
| *H01M 4/62* | (2006.01) |
| *H01M 10/052* | (2010.01) |
| *H01M 4/36* | (2006.01) |
| *H01M 10/42* | (2006.01) |
| *H01M 4/02* | (2006.01) |

(52) U.S. Cl.
CPC .... *H01M 10/052* (2013.01); *H01M 2010/4292* (2013.01); *H01M 4/625* (2013.01); *H01M 2004/021* (2013.01); *Y02E 60/122* (2013.01); *H01M 4/5825* (2013.01); *H01M 4/366* (2013.01)

USPC ........... 429/220; 429/221; 429/223; 429/229; 429/231.5; 429/231.95; 429/231.8; 429/224; 252/182.1

(58) Field of Classification Search
CPC .......... H01M 4/00; H01M 4/13; H01M 4/50; H01M 4/42; H01M 4/58; H01M 4/88; H01M 4/38; H01M 10/04
USPC .............. 429/231.8, 231.5, 231.95, 224, 229, 429/223, 221, 220, 217; 252/182.1
See application file for complete search history.

(56) References Cited

U.S. PATENT DOCUMENTS

| | | |
|---|---|---|
| 2002/0182497 A1 | 12/2002 | Kohzaki et al. |
| 2004/0157126 A1 | 8/2004 | Belharouak et al. |

(Continued)

FOREIGN PATENT DOCUMENTS

| | | |
|---|---|---|
| EP | 1850409 | 10/2007 |
| KR | 20070105266 | 10/2007 |

(Continued)

OTHER PUBLICATIONS

English Translation of KR 1020070046090.*

(Continued)

*Primary Examiner* — Patrick Ryan
*Assistant Examiner* — Kiran Quraishi
(74) *Attorney, Agent, or Firm* — Robert E. Bushnell, Esq.

(57) ABSTRACT

Disclosed is a positive active material for a rechargeable lithium battery and a rechargeable lithium battery including the same, and the positive active material includes a carbon material having a structure with "n" polycyclic nano sheets, wherein "n" is an integer of 1 to 30 with hexagonal rings having six carbon atoms condensed and substantially aligned in a plane, the polycyclic nano sheets are laminated in a vertical direction to the plane; and a lithium-containing olivine-based compound attached to the surface of the carbon material is formed with a carbon-coating layer on its surface.

19 Claims, 2 Drawing Sheets

(56) References Cited

U.S. PATENT DOCUMENTS

| | | | |
|---|---|---|---|
| 2006/0035150 A1 | 2/2006 | Audemer et al. | |
| 2007/0184352 A1 | 8/2007 | Donoue et al. | |
| 2008/0220329 A1 | 9/2008 | Kojima et al. | |
| 2009/0023069 A1 | 1/2009 | Tian et al. | |
| 2009/0117467 A1 | 5/2009 | Zhamu et al. | |
| 2009/0186276 A1* | 7/2009 | Zhamu et al. | 429/221 |
| 2010/0233538 A1* | 9/2010 | Nesper et al. | 429/217 |
| 2012/0058397 A1* | 3/2012 | Zhamu et al. | 429/231.8 |

FOREIGN PATENT DOCUMENTS

| | | | | |
|---|---|---|---|---|
| KR | 20080022494 | | 3/2008 | |
| KR | 100834054 B | | 6/2008 | |
| KR | 20080049157 | | 6/2008 | |
| KR | 1020070046090 | * | 6/2008 | H01M 4/58 |
| KR | 10-2010-0088667 A | | 8/2010 | |

OTHER PUBLICATIONS

Korean Notice of Allowance issued on Jun. 29, 2012 in the corresponding Korean Patent Application No. 10-2010-0122753.

Wang et al. "A facile method of preparing mixed conducting LiFePO4/graphene composites for lithium-ion batteries." Solid State Ionics. 181 (2010): 1665-1689.

Korean Office Action issued by Korean Patent Office on Mar. 20, 2012 in connection with Korean Patent Application Serial No. 10-2010-0122753 and Request for Entry of the Accompanying Office Action attached herewith.

Y. Ding et al., Preparation of nano-structured LiFePO4/graphene composites by co-precipitation method, Electrochem. Commun. (2010) 12 pp. 10-13, cited in Korean Office Action by Korean Patent Office on Mar. 20, 2012 in connection with Korean Patent Application Serial No. 10-2010-0122753.

* cited by examiner

POSITIVE ACTIVE MATERIAL FOR RECHARGEABLE LITHIUM BATTERY AND RECHARGEABLE LITHIUM BATTERY

CLAIM PRIORITY

This application claims priority to and the benefit of Korean Patent Application No. 10-2010-0122753 filed in the Korean Intellectual Property Office on Dec. 3, 2010, the entire contents of which are incorporated herein by reference.

BACKGROUND OF THE INVENTION

1. Field of the Invention

This disclosure relates to a positive active material for a rechargeable lithium battery and a rechargeable lithium battery including the same.

2. Description of the Related Art

Lithium rechargeable batteries have recently drawn attention as a power source for small portable electronic devices. They use an organic electrolyte solution and thereby have twice the discharge voltage than a conventional battery using an alkali aqueous solution, and accordingly, have high energy density.

As for positive active materials of a rechargeable lithium battery, there has been research conducted on a lithium-transition element composite oxide that can intercalate lithium, such as $LiCoO_2$, $LiMn_2O_4$, $LiNi_{1-x}Co_xO_2$ (0<x<1), and so on.

On the other hand, negative active materials of a rechargeable lithium battery have included various carbon-based materials such as artificial graphite, natural graphite, and hard carbon, and lithium composite compounds, such as a metal-based, which can all intercalate and deintercalate lithium ions.

SUMMARY OF THE INVENTION

One aspect of the present invention provides a positive active material for a rechargeable lithium battery having excellent volume energy density and cell loading characteristics due to a low electrical resistance.

Another embodiment of the present invention provides a rechargeable lithium battery including the positive active material.

According to one aspect of the present invention, a positive active material for a rechargeable lithium battery is provided that includes a carbon material having a structure that includes "n" polycyclic nano sheets (wherein "n" is an integer of 1 to 30) that have hexagonal rings having six carbon atoms which are condensed with each other and aligned substantially in one plane. The sheets are laminated in a substantially vertical direction with respect to the plane of the hexagonal rings; and a lithium-containing olivine-based compound is present on the carbon material surface and formed with a carbon layer on its surface.

The carbon material may have an average size of about 300 nm to about 50 μm.

The lithium-containing olivine-based compound may have an average particle size of about 50 nm to about 1 μm.

The lithium-containing olivine-based compound including the carbon-coating layer on the surface may be coated as a film-type on the surface of the carbon material, or as an island-type on the surface of the carbon material.

The lithium-containing olivine-based compound including the carbon-coating layer on the surface may be coated on the carbon material surface with a thickness ranging from about 100 nm to about 5 μm.

In other embodiments, the carbon-coating layer may have a thickness ranging from about 10 nm to about 100 nm.

The lithium-containing olivine-based compound may be a compound represented by the following Chemical Formula 1.

Chemical Formula 1

In Chemical Formula 1, A is Mn or Fe,

M is Fe, Co, Ti, Ni, Cu, Zn, Zr, Nb, Mo, or a combination thereof,

Z is F, S, or a combination thereof,

0<a≤1,

0≤x≤1, and

0≤y≤0.5.

In the positive active material, the carbon material may be included in about 0.5 parts by weight to about 50 parts by weight based on 100 parts by weight of the lithium-containing olivine-based compound formed with the carbon-coating layer on the surface.

According to another embodiment of the present invention, a rechargeable lithium battery is provided that includes a positive electrode including the positive active material and a binder, a negative electrode including a negative active material, and a non-aqueous electrolyte.

Hereinafter, further embodiments of the present invention will be described in detail.

According to an embodiment of the present invention, a positive active material for a rechargeable lithium battery having excellent volume energy density and cell loading characteristics due to a low electrical resistance is provided.

DETAILED DESCRIPTION OF THE INVENTION

Exemplary embodiments of the present invention will hereinafter be described in detail. However, these embodiments are only exemplary, and the present invention is not limited thereto.

According to one embodiment of the present invention, a positive active material for, a rechargeable lithium battery includes a carbon material and a lithium-containing olivine-based compound attached to the surface of carbon material. The carbon material has a structure including "n" polycyclic nano sheets, wherein "n" is an integer of 1 to 30, and hereinafter, referred to "carbon material" with hexagonal rings having six carbon atoms condensed and substantially aligned in one plane containing the hexagonal rings. The carbon material is layered in a vertical direction to the plane containing the hexagonal rings. Furthermore, a carbon layer is formed on a surface of the lithium-containing olivine-based compound.

The lithium-containing olivine-based compound may be a compound represented by the following Chemical Formula 1.

Chemical Formula 1

In Chemical Formula 1, A is Mn or Fe,

M is Fe, Co, Ti, Ni, Cu, Zn, Zr, Nb, Mo, or a combination thereof,

Z is F, S, or a combination thereof,

0<a≤1,

0≤x≤1, and

0≤y≤0.5.

The lithium-containing olivine-based compound has a generally higher electrical resistance compared with a cobalt-based active material. Accordingly, when it is charged and discharged at a high current, the charge and discharge capacity may be decreased according to performing the charge and discharge due to increasing the battery resistance.

In one embodiment, the lithium-containing olivine-based compound may be attached as a film-type, i.e., a layer by substantially covering the carbon material surface having the structure, or be attached as an island-type exposing a part of the carbon material surface. When it is present as an island-type, it may improve the contact characteristic of the active material and the conductive material to further improve cycle life characteristic or output characteristic.

Since the positive active material according to one embodiment of the present invention includes a carbon material having the aforementioned structure with excellent electrical conductivity together with the lithium-containing olivine-based compound, it may decrease the high electrical resistance of the lithium-containing olivine-based compound, so as a result, it may decrease the resistance of the positive active material. The effects of decreasing the resistance of the lithium-containing olivine-based compound may be effectively obtained when the lithium-containing olivine-based compound is attached to the carbon material surface according to one embodiment. When the lithium-containing olivine-based compound is simply and physically mixed with the carbon material, the carbon material becomes more agglomerated, and the dispersing degree is decreased, so as to not provide smooth electrical conductivity. On the other hand, when the lithium-containing olivine-based compound is attached to the carbon material surface, it may increase the contact point of the carbon material is contacted with the lithium-containing olivine-based compound. Accordingly, the increased contact point allows charge transfer to readily occur, thereby to effectively decreasing the resistance of the lithium-containing olivine-based compound.

In addition, the lithium-containing olivine-based compound is coated with a carbon-coating layer on the surface, so it may not only improve the electrical conductivity owing to use of the carbon material core, but also further improves the electrical conductivity due to the carbon-coating layer. In addition, the carbon-coating layer plays a role as a conductive material. Therefore, the positive electrode including the positive active material according to one embodiment of the present invention may not need a conductive material separately.

The carbon-coating layer coated on the surface of the lithium-containing olivine-based compound may have a thickness ranging from about 10 nm to about 100 nm. When the carbon-coating layer has a thickness within this range, it may maximize the electrical conductivity and also further improves the electrode density. The carbon-coating layer may be included in an amount of about 0.01 to about 1.0 parts by weight based on 100 parts by weight of the lithium-containing olivine-based compound. When the carbon-coating layer is included within this range, the capacity of a battery is improved by improving electrical conductivity of a lithium-containing olivine-based compound and simultaneously increasing the electrode density.

Further, the carbon-coating layer may be carbon black, acetylene black, ketjen black, or combinations thereof.

The core of the carbon material may have an average size ranging from about 300 nm to about 50 μm. When the carbon material core has an average size within this range, it is possible to better achieve good electrical conductivity of the carbon material core, and further increase the contact point with the lithium-containing olivine-based compound, so it may further improve the capacity and density.

The lithium-containing olivine-based compound may have an average particle size ranging from about 50 nm to about 1 μm. When the lithium-containing olivine-based compound has an average particle size within this range, it may further improve the density, so as to enhance the capacity and to quickly move lithium ions. Thereby, it may further improve the high power and cycle-life characteristics.

The lithium-containing olivine-based compound having the carbon-coating layer may be included with a thickness of about 100 nm to about 5 μm on the surface of the carbon material. The thickness indicates the layer thickness when the lithium-containing olivine-based compound having the carbon-coating layer is present as a film-type, i.e. layer; and the thickness refers to the size of an island on the carbon material surface when it is present as an island-type layer. When the lithium-containing olivine-based compound having a carbon-coating layer has this thickness range, it may further improve the conductivity of a positive electrode and decrease the amount of the conductive material in the electrode, thereby relatively increasing the active material ratio which results in improvements of battery capacity and charge and discharge rate.

The positive active material according to one embodiment of the present invention may include the carbon material within the range of about 0.5 parts by weight to about 50 parts by weight based on 100 parts by weight of the lithium-containing olivine-based compound including the carbon-coating layer on the surface.

The positive active material according to one embodiment may be obtained by generating static electricity on the carbon material surface and letting the lithium-containing olivine-based compound formed with the carbon-coating layer on the surface be attached to the carbon material surface. This process may be performed by mixing the carbon material with the lithium-containing olivine-based compound formed with the carbon-coating layer on the surface in an appropriate ratio; applying centrifugal force; and maintaining the same for about 5 minutes to about 10 minutes. The centrifugal force may range from about 5,000 rpm to about 16,000 rpm. The lithium-containing olivine-based compound formed with the carbon-coating layer on the surface may be commercially available, or it may be prepared by forming the carbon-coating layer on the lithium-containing olivine-based compound. It may be manufactured according to any known process such as liquid coating or dry coating, or the like. The liquid coating may include spray coating, dipping coating or the like; and the dry coating may include milling.

In addition, the positive active material according to one embodiment may include a first positive active material including the carbon material and a lithium-containing olivine-based compound attached to the carbon material surface, and formed with a carbon-coating layer on the surface, and further include a second positive active material of a lithium-containing olivine-based compound formed with a carbon-coating layer on the surface. Even in the case that a first positive active material is mixed with a second positive active material, the amount of carbon material present in the final positive active material is adjusted to be within the range of about 0.5 parts by weight to about 50 parts by weight based on 100 parts by weight of the lithium-containing olivine-based compound formed with the carbon-coating layer on the surface. The mixing ratio may be easily adjusted by one skilled in the art. When it is adjusted as in above, it may further improve the capacity characteristic.

The rechargeable lithium battery according to another embodiment of the present invention includes a positive electrode including the positive active material and a binder, a negative electrode including a negative active material, and a non-aqueous electrolyte.

The positive electrode includes a positive active material layer including a positive active material and a binder, and a current collector supporting the positive active material layer.

The positive active material is as described above.

The positive active material layer may further include a conductive material. In addition, when the negative active material layer further includes a conductive material, it may be included at about 1 part by weight to about 20 parts by weight based on 100 parts by weight of the positive active material.

The binder improves properties for binding active material particles with one another and with a current collector. Examples of the binder may include polyvinyl alcohol, carboxylmethyl cellulose, hydroxypropyl cellulose, diacetyl cellulose, polyvinyl chloride, carboxylated polyvinyl chloride, polyvinyl difluoride, polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, or nylon, but are not limited thereto.

The current collector may be aluminum (Al), but is not limited thereto.

When the positive active material layer further includes a conductive material, it may be any generally-used conductive material for a rechargeable lithium battery. Examples of the conductive material include a carbon-based material such as natural graphite, artificial graphite, carbon black, acetylene black, ketjen black, a carbon fiber, and the like; a metal-based material such as a metal powder, a metal fiber or the like including copper, nickel, aluminum, silver, and the like; a conductive polymer such as a polyphenylene derivative; or mixtures thereof.

The negative electrode includes a negative active material layer including a negative active material and a binder, and a current collector supporting the negative active material layer.

The negative active material may be included in an amount ranging from about 95 wt % to about 99 wt % based on the total weight of the negative active material layer.

The negative active material layer may further include a binder and selectively a conductive material. The binder may be included in an amount ranging from 1 wt % to 5 wt % based on the total weight of the negative active material layer. In addition, when the negative active material layer further includes a conductive material, it may be included at 90 wt % to 98 wt % of the negative active material, 1 wt % to 5 wt % of the binder, and 1 wt % to 5 wt % of the conductive material.

The binder improves properties for binding active material particles with one another and with a current collector. The binder may include a non-water-soluble binder, a water-soluble binder, or combinations thereof.

Examples of the non-water-soluble binder include polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, polyamideimide, polyimide, and a combination thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth) acrylic acid alkyl ester, or combinations thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts to by weight of the binder.

The current collector may be selected from the group consisting of a copper foil, a nickel foil, a stainless steel foil, a titanium foil, a nickel foam, a copper foam, a polymer substrate coated with a conductive metal, and combinations thereof.

The negative active material layer may further include a conductive is material. The conductive material may be any generally-used conductive material for a rechargeable lithium battery. Examples of the conductive material include a carbon-based material such as natural graphite, artificial graphite, carbon black, acetylene black, ketjen black, a carbon fiber, and the like; a metal-based material such as a metal powder, a metal fiber or the like including copper, nickel, aluminum, silver, and the like; a conductive polymer such as a polyphenylene derivative; or mixtures thereof.

The positive electrode and the negative electrode may be obtained by a general process including mixing a positive active material, a binder, and selectively a conductive material in a solvent to provide an active material composition; coating the active material composition on a current collector, and drying and pressing the same. The solvent includes N-methylpyrrolidone or the like, but is not limited thereto. The positive electrode-manufacturing method is well known and thus is not described in detail in the present specification.

The non-aqueous electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with desirable battery performance.

The carbonate-based solvent may be prepared by mixing a cyclic carbonate and a linear carbonate. The cyclic carbonate and the linear carbonate are mixed together in a volume ratio ranging from about 1:1 to about 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula 2.

Chemical Formula 2

In Chemical Formula 2, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include an additive of vinylene carbonate, an ethylene carbonate-based compound represented by the following Chemical Formula 3.

Chemical Formula 3

In Chemical Formula 3, $R_7$ and $R_8$ are independently selected from the group consisting of hydrogen, a halogen, a cyano group (CN), a nitro group ($NO_2$), and a C1 to C5 fluoroalkyl group, provided that at least one of $R_7$ and $R_8$ is selected from the group consisting of a halogen, a cyano group (CN), a nitro group ($NO_2$), and a C1 to C5 fluoroalkyl group.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive used to improve cycle life may be adjusted within an appropriate range.

The lithium salt is dissolved in an organic solvent, supplies lithium ions in a battery, operates a basic operation of a rechargeable lithium battery, and improves lithium ion transportation between positive and negative electrodes therein. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

Figure 1:
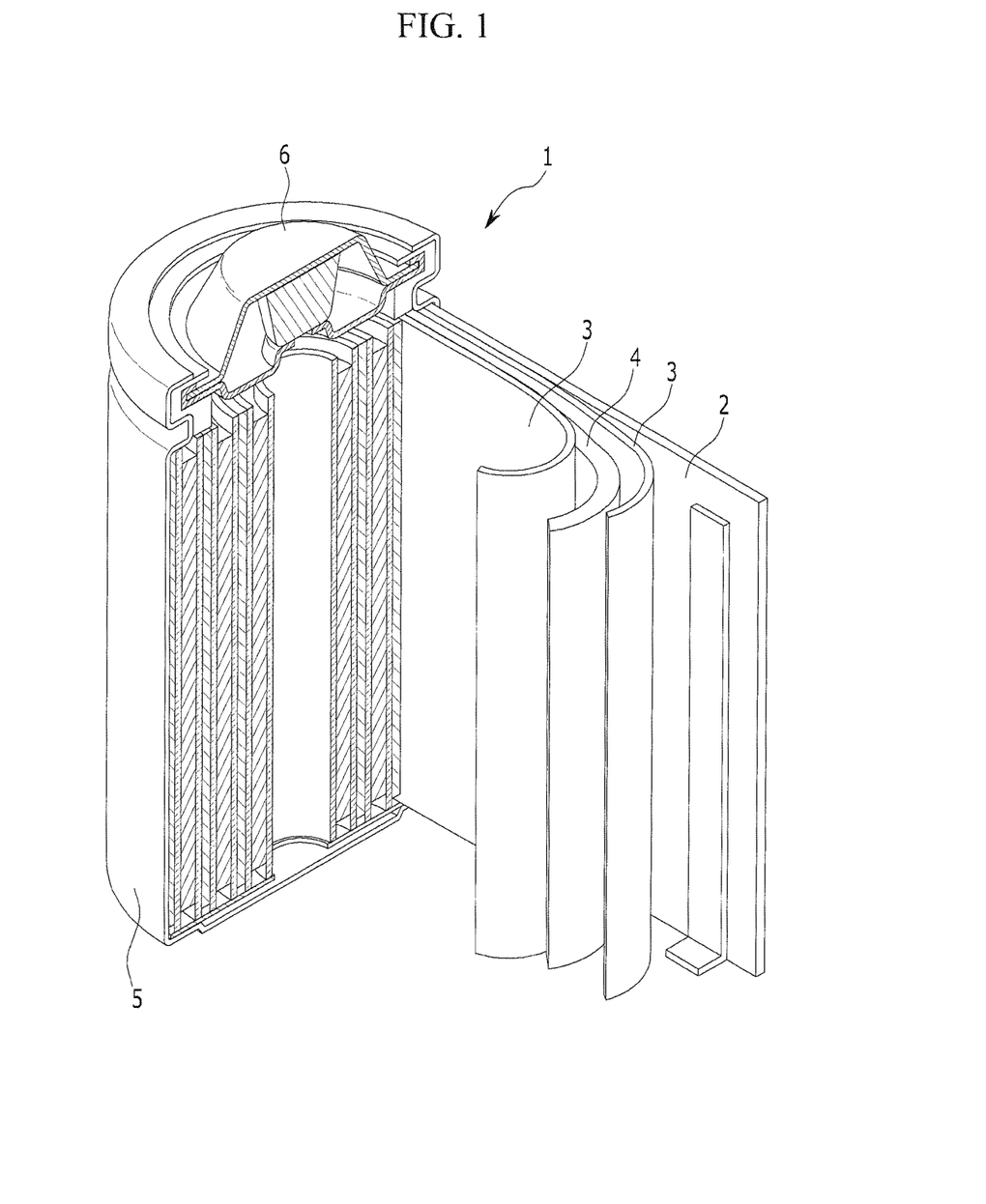
FIG. 1 shows the structure of a rechargeable lithium battery according to one embodiment of the present invention.
Figure 2:
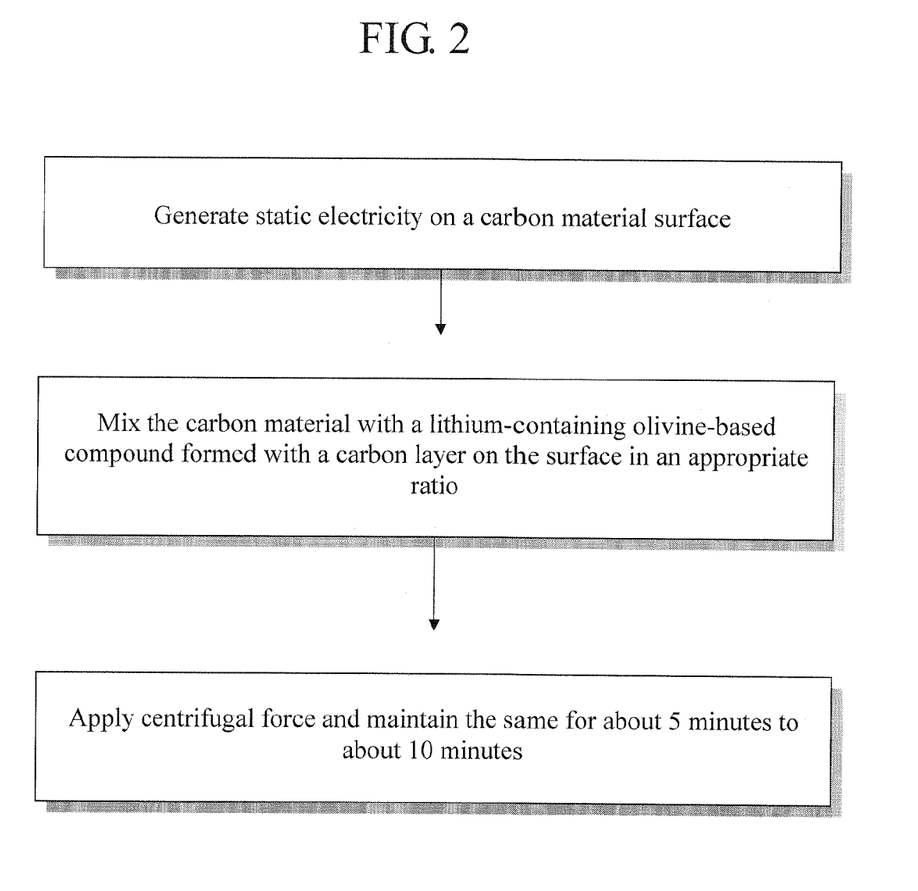
FIG. 2 is a flowchart showing the preparation of a position active material according to one embodiment of the invention.

FIG. 1 is a schematic view showing a representative structure of a rechargeable lithium battery according to one embodiment. As shown in FIG. 1, the rechargeable lithium battery 1 includes a battery case 5 including a positive electrode 4, a negative electrode 2, and a separator 3 interposed between the positive electrode 4 and the negative electrode 2, an electrolyte solution impregnated therein, and a sealing member 6 sealing the battery case 5.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered is separator, a polyethylene/polypropylene/polyethylene triple-layered separator, and a polypropylene/polyethylene/polypropylene triple-layered separator.

The following examples illustrate the present invention in more detail. These examples, however, are not in any sense to be interpreted as limiting the scope of this invention.

Example 1

$LiFePO_4$ (manufactured by Phostech) with a carbon black coating layer (thickness: 0.1 μm) is formed on the surface is mixed with a carbon material including "n" polycyclic nano-sheets (wherein "n" is an integer of 1 to 10) with hexagonal rings having six carbon atoms condensed and aligned in one plane are laminated in a vertical direction to the one plane and a centrifugal force of about 15,000 rpm is applied to the resulting mixture. The $LiFePO_4$ formed with the carbon black coating layer on the surface is mixed with the carbon material in a weight ratio of about 10:1.

As a result, $LiFePO_4$ formed with carbon black coating layer on the surface is present on the surface of carbon material as an island-type coating to provide a first positive active material.

The first positive active material is mixed with a second positive active material of $LiFePO_4$ (manufactured by Phostech) formed with a carbon black coating layer (thickness: 0.1 μm) on the surface to provide a final positive active material.

The first and the second positive active materials are mixed in a ratio to provide a carbon material amount of about 2 parts by weight based on 100 parts by weight of $LiFePO_4$ formed with the carbon black coating layer on the surface (included in the first and the second active material) in the final positive active material.

The carbon material has an average size of about 20 μm; the LiFePO$_4$ has an average particle diameter of about 0.4 μm; and the LiFePO$_4$ is attached to the carbon material surface at a thickness of about 1 μm. In addition, in the LiFePO$_4$ formed with the carbon black coating layer on the surface of the first and the second positive active material, the carbon black coating layer is included in about 2.5 parts by weight based on 100 parts by weight of LiFePO$_4$ of the first and the second active material.

A positive active material slurry is prepared by mixing the positive active material, a polyvinylidene binder, and a carbon black conductive material in an N-methylpyrrolidone solvent. Herein, the positive active material, the polyvinylidene binder, and the carbon black conductive material are mixed 100:5.5:4 parts by weight. A positive electrode is prepared by the general process including coating the positive active material slurry on an aluminum (Al) current collector, drying, and pressing the same.

Example 2

LiFePO$_4$ with a carbon black coating layer (thickness: 0.1 μm) formed on the surface is mixed with a carbon material with "n" polycyclic nano-sheets (wherein "n" is an integer of 1 to 10) with hexagonal rings having six carbon atoms condensed and aligned in one plane are laminated in a vertical direction to the one plane and a centrifugal force of about 15,000 rpm is applied to the resulting mixture. The LiFePO$_4$ formed with the carbon black coating layer on the surface is mixed with the carbon material in a weight ratio of about 10:1.

As a result, LiFePO$_4$ formed with the carbon black coating layer on the surface is present on the surface of the carbon material as an island-type layer to provide a first positive active material.

The first positive active material is mixed with a second positive active material of LiFePO$_4$ (manufactured by Phostech) formed with a carbon black coating layer (thickness: 0.1 μm) on the surface to provide a final positive active material. The first and the second positive active materials are mixed in a ratio to provide a carbon material amount of about 3 parts by weight based of 100 parts by weight of LiFePO$_4$ formed with the carbon black coating layer on the surface (included in the first and the second active material) of the final positive active material.

The carbon material has an average size of about 20 μm; the LiFePO$_4$ has an average particle diameter of about 0.4 μm; and the LiFePO$_4$ is attached to the carbon material surface in a thickness of about 1 μm. In addition, in the LiFePO$_4$ formed with the carbon black coating layer on the surface, the carbon black coating layer is included in about 2.5 parts by weight based on 100 parts by weight of LiFePO$_4$ of the first and the second active material.

A positive active material slurry is prepared by mixing the positive active material, a polyvinylidene binder, and a carbon black conductive material in an N-methylpyrrolidone solvent. Herein, the positive active material, the polyvinylidene binder, and the carbon black conductive material are mixed in about 100:5.5:3 parts by weight. A positive electrode is prepared by the general process including coating the positive active material slurry on an aluminum (Al) current collector, drying, and pressing the same.

Example 3

LiFePO$_4$ with a carbon black coating layer (thickness: 0.1 μm) formed on the surface is mixed with a carbon material with "n" polycyclic nano-sheets (wherein "n" is an integer of 1 to 10) with hexagonal rings having six carbon atoms condensed and aligned in one plane are laminated in a vertical direction to the one plane and a is centrifugal force of about 15,000 rpm is applied to the resulting mixture. The LiFePO$_4$ formed with the carbon black coating layer on the surface is mixed with the carbon material in a weight ratio of about 10:1.

As a result, LiFePO$_4$ formed with the carbon black coating layer on the surface is present on the surface of carbon material as an island to provide a first positive active material.

The first positive active material is mixed with a second positive active material of LiFePO$_4$ (manufactured by Phostech) formed with carbon black coating layer (thickness: 0.1 μm) on the surface to provide a final positive active material. The first and the second positive active materials are mixed in a ratio to provide a carbon material amount of about 4 parts by weight based on 100 parts by weight of LiFePO$_4$ formed with the carbon black coating layer on the surface (included in the first and the second active material) of the final positive active material.

The carbon material has an average size of about 20 μm; the LiFePO$_4$ has an average particle diameter of about 0.4 μm; and the LiFePO$_4$ is present on the carbon material surface in a thickness of about 1 μm. In addition, in the LiFePO$_4$ formed with the carbon black coating layer on the surface, the carbon black coating layer is included in about 2.5 parts by weight based on 100 parts by weight of LiFePO$_4$ of the first and the second active material.

A positive active material slurry is prepared by mixing the positive active material, a polyvinylidene binder, and a carbon black conductive material in an N-methylpyrrolidone solvent. Herein, the positive active material, the polyvinylidene binder, and the carbon black conductive material are mixed in about 100:5.5:2 parts by weight. A positive electrode is prepared by a general process including coating the positive active material slurry on an aluminum (Al) current collector, drying, and pressing the same.

Example 4

LiFePO$_4$ (manufactured by Phostech) with a carbon black coating layer (thickness: 0.1 μm) formed on the surface is mixed with a carbon material with "n" polycyclic nano-sheets (wherein "n" is an integer of 1 to 10) with hexagonal rings having six carbon atoms condensed and aligned in one plane are laminated in a vertical direction to the one plane and a centrifugal force of about 15,000 rpm is applied to the resulting mixture. The LiFePO$_4$ formed with the carbon black coating layer on the surface is mixed with the carbon material in a weight ratio of about 10:1.

As a result, LiFePO$_4$ formed with a carbon black coating layer on the surface is present on the surface of the carbon material as an island layer to provide a first positive active material.

The first positive active material is mixed with a second positive active material of LiFePO$_4$ (manufactured by Phostech) formed with a carbon black coating layer (thickness: 0.1 μm) on the surface to provide a final positive active material. The first and the second positive active materials are mixed in a ratio to provide a carbon material amount of about 3 parts by weight based on 100 parts by weight of LiFePO$_4$ formed with the carbon black coating layer on the surface in the final positive active material.

The carbon material has an average size of about 20 μm; the LiFePO$_4$ has an average particle diameter of about 0.4 μm; and the LiFePO$_4$ is present on the carbon material surface in a thickness of about 1 μm. In addition, in the LiFePO$_4$ formed with the carbon black coating layer on the surface of the first and the second positive active materials, the carbon black coating layer is included in about 2.5 parts by weight based on 100 parts by weight of $LiFePO_4$ of the first and the second active material.

A positive active material slurry is prepared by mixing the positive active material, a polyvinylidene binder, and a carbon black conductive material in an N-methylpyrrolidone solvent. Herein, the positive active material, the polyvinylidene binder, and the carbon black conductive material are mixed in about 100:5.5:4 parts by weight. A positive electrode is prepared by the general process including coating the positive active material slurry on an aluminum (Al) current collector, drying, and pressing the same.

Comparative Example 1

$LiFePO_4$ with a carbon black coating layer (thickness: 0.1 μm) formed on the surface is mixed with a carbon material with "n" polycyclic nano-sheets (wherein "n" is an integer of 1 to 10) with hexagonal rings having six carbon atoms condensed and aligned in one plane are laminated in a vertical direction to the one plane, to prepare a positive active material. The carbon material is mixed at about 2 parts by weight based on 100 parts by weight of $LiFePO_4$ formed with the carbon black coating layer on the surface.

The carbon material has an average size of about 20 μm; and the $LiFePO_4$ has an average particle diameter of about 0.4 μm. In addition, in the $LiFePO_4$ formed with the carbon black coating layer on the surface, the carbon black coating layer is included at about 2.5 parts by weight based on 100 parts by weight of $LiFePO_4$.

A positive active material slurry is prepared by mixing the positive active material, a polyvinylidene binder, and a carbon black conductive material in an N-methylpyrrolidone solvent. Herein, the positive active material, the polyvinylidene binder, and the carbon black conductive material are mixed at about 100:5.5:4 parts by weight. A positive electrode is prepared by general process including coating the positive active material slurry on an aluminum (Al) current collector, drying, and pressing the same.

Comparative Example 2

$LiFePO_4$ with a carbon black coating layer (thickness: 0.1 μm) formed on the surface is used as a positive active material. In the $LiFePO_4$ with the carbon black coating layer formed on the surface, the carbon black coating layer is included at about 2.5 parts by weight based on 100 parts by weight of $LiFePO_4$. The $LiFePO_4$ has an average particle diameter of about 0.4 μm.

A positive active material slurry is prepared by mixing the positive active material, a polyvinylidene binder, and a carbon black conductive material in an N-methylpyrrolidone solvent. Herein, the positive active material, the polyvinylidene binder, and the carbon black conductive material are mixed at about 100:5.5:6 parts by weight. A positive electrode is prepared by a general process including coating the positive active material slurry on an aluminum (Al) current collector, drying, and pressing the same.

Evaluation of Electrode Resistance and Battery Resistance

The positive electrodes according to Examples 1 to 4 and Comparative Examples 1 to 2 are respectively used with a lithium metal counter electrode and an electrolyte, fabricating a half-cell. The electrolyte is prepared by dissolving 1.3M $LiPF_6$ in a mixed solvent (3:3:4 volume ratio) of ethylene carbonate, ethylmethyl carbonate, and dimethyl carbonate.

The positive electrodes according to Examples 1 to 4 and Comparative Examples 1 to 2 and the prepared half-cells are respectively measured for their resistance. The results are provided in the following Table 1. In the following Table 1, the amount of $LiFePO_4$ formed with the carbon black coating layer on the surface indicates the amount included in the final positive active material.

TABLE 1

| | Amount of $LiFePO_4$ including a carbon black coating layer on its surface (parts by weight) | Amount of carbon material (parts by weight) | Amount of carbon black in a positive active material slurry (parts by weight) | Electrode resistance (Ω) | Cell resistance (mΩ) |
|---|---|---|---|---|---|
| Comparative Example 1 | 100 | 2 | 4 | 530 | 41 |
| Comparative Example 2 | 100 | 0 | 6 | 510 | 40 |
| Example 1 | 100 | 2 | 4 | 350 | 36 |
| Example 2 | 100 | 3 | 3 | 280 | 34 |
| Example 3 | 100 | 4 | 2 | 380 | 37 |
| Example 4 | 100 | 3 | 4 | 220 | 31 |

As shown in Table 1, it is seen that the half-cells including positive electrodes obtained from Examples 1 to 4 have lower resistance than those including positive electrodes obtained from Comparative Examples 1 and 2.

From the results, it is shown that battery cells including positive active materials obtained from Examples 1 to 4 will have excellent volume energy density and cell loading characteristics.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a rechargeable lithium battery comprising:
   particles of a carbon material having a structure including "n" polycyclic nano sheets, "n" being an integer of from 1 to 30, the sheets each having hexagonal rings, the hexagonal rings each having six carbon atoms and being condensed and substantially aligned in a single plane within each sheet, the polycyclic nano sheets being parallel and being layered in a perpendicular direction with respect to each plane containing the hexagonal rings, the particles each having exterior surfaces; and
   a lithium-containing olivine-based compound forming islands upon and being coated onto the exterior surfaces of the carbon material particles, with a carbon layer on the surface of the lithium containing olivine based compound.

2. The positive active material for a rechargeable lithium battery of claim 1, wherein the carbon material has an average particle size of about 300 nm to about 50 μm.

3. The positive active material for a rechargeable lithium battery of claim 1, wherein the lithium-containing olivine-based compound has an average particle size of about 50 nm to about 1 μm.

4. The positive active material for a rechargeable lithium battery of claim 1, wherein the lithium-containing olivine-based compound comprising the carbon layer on the surface is disposed as a layer on the entire surface of the carbon material, or as an island layer on the surface of the carbon material.

5. The positive active material for a rechargeable lithium battery of claim 1, wherein the lithium-containing olivine-based compound comprising a carbon layer on the surface is disposed on the carbon material surface in a thickness ranging from about 100 nm to about 5 μm.

6. The positive active material for a rechargeable lithium battery of claim 1, wherein the carbon layer has a thickness ranging from about 10 nm to about 100 nm.

7. The positive active material for a rechargeable lithium battery of claim 1, wherein the carbon layer is included at about 0.01 parts to about 1.0 parts by weight based on 100 parts by weight of the lithium-containing olivine-based compound.

8. The positive active material for a rechargeable lithium battery of claim 1, wherein the lithium-containing olivine-based compound is a compound represented by the following Chemical Formula 1:

$$Li_aA_{1-x}M_xPO_{4-y}Z_y \qquad \text{Chemical Formula 1}$$

wherein, A is Mn or Fe,
M is Fe, Co, Ti, Ni, Cu, Zn, Zr, Nb, Mo, or a combination thereof,
Z is F, S, or a combination thereof,
$0 \leq a \leq 1$,
$0 \leq x \leq 1$, and
$0 \leq y \leq 0.5$.

9. The positive active material for a rechargeable lithium battery of claim 1, wherein the carbon material is included at about 0.5 parts by weight to about 50 parts by weight based on 100 parts by weight of the lithium-containing olivine-based compound formed with a carbon layer on the surface.

10. A rechargeable lithium battery, comprising
a positive electrode comprising a positive active material comprising particles of a carbon material having a structure including "n" polycyclic nano sheets, "n" being an integer of from 1 to 30, the sheets each having hexagonal rings, the hexagonal rings each having six carbon atoms and being condensed and substantially aligned in a single plane within each sheet, the polycyclic nano sheets being parallel and being layered in a perpendicular direction with respect to each plane containing the hexagonal rings, the particles each having exterior surfaces; and
a lithium-containing olivine-based compound forming islands upon and being coated onto the exterior surfaces of the carbon material particles, with a carbon layer on the surface of the lithium-containing olivine-based compound;
a negative electrode comprising a negative active material; and
a non-aqueous electrolyte.

11. The rechargeable lithium battery of claim 10, wherein the carbon material has an average particle size of about 300 nm to about 50 μm.

12. The rechargeable lithium battery of claim 10, wherein the lithium-containing olivine-based compound has an average particle size of about 50 nm to about 1 μm.

13. The rechargeable lithium battery of claim 10, wherein the lithium-containing olivine-based compound comprising the carbon layer on the surface is disposed as a layer on the surface of the carbon material, or as an island layer on the surface of the carbon material.

14. The rechargeable lithium battery of claim 10, wherein the lithium-containing olivine-based compound comprising a carbon layer on the surface is disposed on the carbon material surface with a thickness ranging from about 100 nm to about 5 μm.

15. The rechargeable lithium battery of claim 10, wherein the carbon layer has a thickness ranging from about 10 nm to about 100 nm.

16. The rechargeable lithium battery of claim 10, wherein the carbon layer is included at about 0.01 parts to about 1.0 part by weight based on 100 parts by weight of the lithium-containing olivine-based compound.

17. The rechargeable lithium battery of claim 10, wherein the lithium-containing olivine-based compound is a compound represented by the following Chemical Formula 1:

$$Li_aA_{1-x}M_xPO_{4-y}Z_y \qquad \text{Chemical Formula 1}$$

wherein, A is Mn or Fe,
M is Fe, Co, Ti, Ni, Cu, Zn, Zr, Nb, Mo, or a combination thereof,
Z is F, S, or a combination thereof,
$0 \leq a \leq 1$,
$0 \leq x \leq 1$, and
$0 \leq y \leq 0.5$.

18. The rechargeable lithium battery of claim 10, wherein the carbon material is included at about 0.5 parts by weight to about 50 parts by weight based on 100 parts by weight of the lithium-containing olivine-based compound, with the carbon-coating layer on the surface.

19. The rechargeable lithium battery of claim 10, wherein the positive electrode further comprise another positive active material including a lithium-containing olivine-based compound formed with a carbon-coating layer on the surface.

* * * * *